Dec. 8, 1953  J. L. EDELEN  2,661,966
ATTACHING THREAD FOR GLASS BOWLS
Filed Dec. 9, 1949

INVENTOR.
JAMES L. EDELEN
BY George R Ericson
ATTORNEY

Patented Dec. 8, 1953

2,661,966

UNITED STATES PATENT OFFICE 2,661,966

ATTACHING THREAD FOR GLASS BOWLS

James L. Edelen, Kirkwood, Mo., assignor to Carter Carburetor Corporation, St. Louis, Mo., a corporation of Delaware Application December 9, 1949, Serial No. 132,150

1 Claim. (Cl. 285—145)

This invention relates to screw threads for assembling tubular members and consists, particularly, in novel construction of the attaching threads of a relatively fragile or yielding member, such as a glass tube or bowl.

The fuel filters and fuel pumps utilized in the fuel supply systems of internal combustion engines customarily are equipped with glass bowls which facilitate settling out of impurities in the fuel or, as in the case of a filter, house the filter unit. Recently, these bowls have been provided with threads for insuring sealing attachment to the body of the pump or filter. The threads however, have been of standard curved or tapered form, such as to apply substantial bending stresses to the edge of the glass during tightening and this has resulted in frequent breakage and improper seals.

The main object of the present invention is to provide bowl attaching threads of the above type wherein bending stresses transversely of the body wall and consequent tendency to shatter the body are reduced to a minimum.

A more detailed object is to provide an attaching thread for a glass bowl which is constructed so as to apply substantially all of its load tangentially and in an axial direction against the sealing gasket.

These objects and other more detailed objects hereafter appearing are attained by the structure illustrated in the accompanying drawing in which Fig. 1 is a vertical, transverse section through a liquid fuel filter embodying the novel threaded attachment of the bowl to the filter body.

Figure 1:
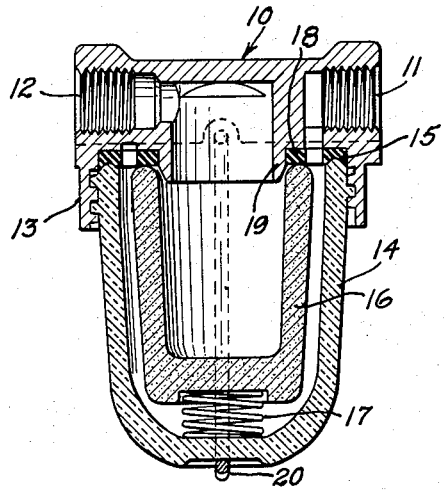

The fuel filter illustrated comprises a die cast body 10 having threaded bosses 11 and 12 for attachment to the fuel line and a depending internally threaded collar 13. A glass bowl 14 has an external thread on its upper extremity for attachment to the threaded collar 13 so as to urge its upper edge against a sealing gasket 15 seated on the body. Within the bowl is a ceramic filter element 16 resting against a coiled compression spring 17 seated in the bottom of the bowl and urging the element against a second sealing gasket 18 surrounding outlet neck 19 depending from the body. After the threads on collar 13 and the bowl are tightly engaged, a bail 20 is hooked beneath the bowl to maintain the assembly against vibration.

Figure 5:
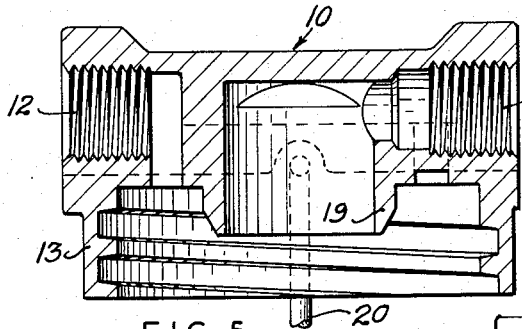
Fig. 5 is an enlarged vertical section through the filter body disassembled.
Figure 4:
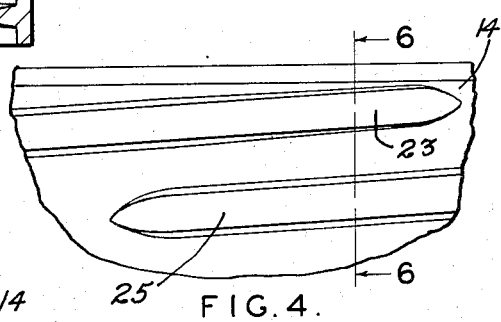
Fig. 4 is an enlarged side view showing the overlapping end portions of the thread.
Figure 6:
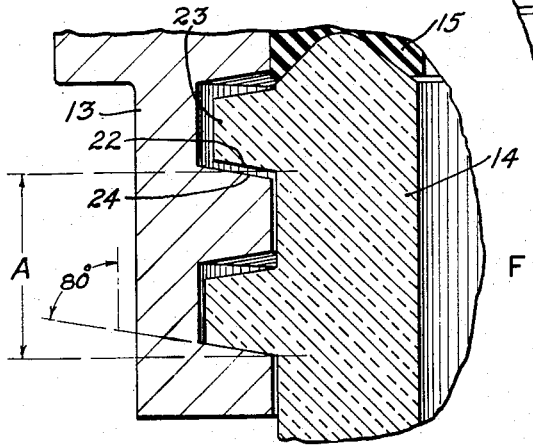
Fig. 6 is a still further enlarged detail vertical section on line 6—6 of Fig. 4.

The complementary, single threads on collar 13 and the bowl are of trapezoidal section, as best shown in Figs. 5 and 6. The side walls of the threads, which are flat in the plane of the axis, are disposed at an included angle of 20°. Thus, each side wall makes an angle of 80° with the thread axis. This angle is necessary to permit withdrawing the core from the filter body in the die casting operation and also to facilitate removal of the glass bowl from its mold. The angle is made to approach as closely to a right angle with the thread axis as is feasible in view of these manufacturing steps. The inner or lower face 22 of the thread, accordingly, is disposed so that the assembly force is applied tangentially to the bowl wall and only a relatively small component of this force or load is resolved as a bending stress which would tend to crack the wall of the bowl.

Figure 3:
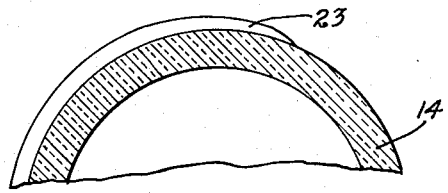
Fig. 3 is a horizontal section on line 3—3 of Fig. 2.
Figure 2:
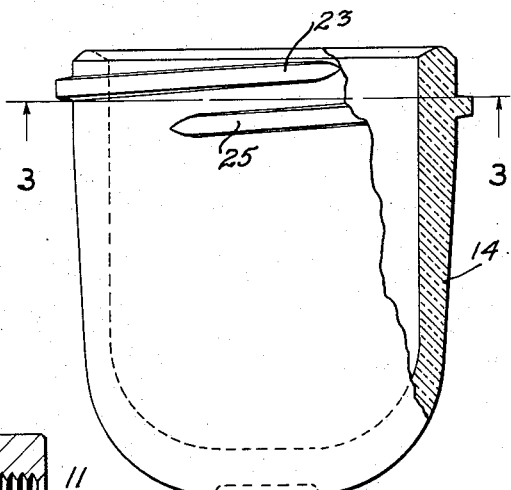
Fig. 2 is an enlarged, side view of the bowl detached and broken away in part to illustrate the thread in section.

In order to further relieve the bowl of bending stresses, the outer or upper extremity 23 of the thread is made narrower and shallower than the remainder thereof (Fig. 3) which is regularly helical. This results in the inner, load-bearing face of this portion of the thread being spaced farther from the load-bearing face at the inner portion 25 of the thread, as indicated by the dimension A in Fig. 6. Since the complementary body thread is uniform, the load face of portion 23 of the thread, in the assembly, clears the opposing face 24 of the thread and, consequently, completely relieves this portion of the upper edge of the bowl from thread load. This thread contour may be produced by gradually withdrawing the tool which cuts or grinds the thread groove in the bowl mold. This upper portion 23 of the thread substantially overlaps the inner portion 25 thereof so that pressure will be applied uniformly entirely around the bowl.

When the bowl is provided with threads as described above, a turning pressure of twenty-five inch pounds has been found sufficient to tightly seal the bowl against the gasket in the die cast body. With the former type of round threads, it was necessary to provide thirty-five inch pounds of torque to insure an effective seal. Moreover, a turning pressure of one hundred-thirty inch pounds would break the edge of a bowl having the older type of threads, whereas a pressure of over three hundred inch pounds is necessary to break the bowl herein described.

Accordingly, the invention has substantially eliminated a serious problem, namely, breakage of the bowl due to the application of excessive tightening pressure. The angle of the load-bearing face of the thread may be varied somewhat from that shown, preferably, approaching a right angle with the thread axis and the shape and number of threads may be varied.

The invention may be modified in these and other respects as will occur to those skilled in the art and the exclusive use of all the modifications as come within the scope of the appended claim is contemplated.

I claim:

The combination of a pair of cylindrical members with complementary attaching threads for fluid tight assembly, one of the members being of relatively unyielding material and including a depending internally threaded annular flange and an inwardly projecting shoulder, a gasket seated on said shoulder, the other member being of relatively fragile material and having a rounded upper gasket engaging marginal edge portion and complementary threads adjacent said rounded edge portion for engaging the threads of said depending annular flange, said engaging threads being of trapezoidal section with their sides forming an included angle of not more than approximately twenty degrees, the threads of said second member having a side surface with a regularly helical, inner, load-bearing part, the end of the thread on the second member terminating in a tapered portion formed at least in part by a gradual reduction in the depth and width of the threads so that said side will clear the adjacent wall of the complementary threads of the first member, when said members are moved into engaging position, whereby the end portions of the threads of the second member are relieved of bending stresses incident to a fluid tight threaded assembly but provide a reinforcement for the fragile structure of which it forms a part, the engaging portions of the thread on said second member making at least a complete revolution of the second member while the reduced end of the thread of the second member is included solely in the part of the thread extending beyond the completed revolution.

JAMES L. EDELEN.

References Cited in the file of this patent

UNITED STATES PATENTS

| Number | Name | Date |
|---|---|---|
| 135,430 | Howson | Feb. 4, 1873 |
| 1,407,335 | Reynolds | Feb. 21, 1922 |
| 1,497,952 | Smith | June 17, 1924 |
| 1,853,808 | Greenwood | Apr. 12, 1932 |
| 2,111,196 | Texter | Mar. 15, 1938 |
| 2,307,685 | Knox | Jan. 5, 1943 |
| 2,313,861 | Caldwell | Mar. 16, 1943 |
| 2,322,131 | Heftler | June 15, 1943 |